(12) United States Patent
Parfait et al.

(10) Patent No.: US 7,050,554 B2
(45) Date of Patent: May 23, 2006

(54) PAYMENT TO CHARITIES WITH PREPAID CARD

(75) Inventors: Béatrice Parfait, Cormelles Le Royal (FR); Eric Depret, Caen (FR); Michel Mirouze, Verson (FR)

(73) Assignee: France Telecom, SA, Paris (FR)

( * ) Notice: Subject to any disclaimer, the term of this patent is extended or adjusted under 35 U.S.C. 154(b) by 587 days.

(21) Appl. No.: 10/203,216

(22) PCT Filed: Feb. 13, 2001

(86) PCT No.: PCT/FR01/00416

§ 371 (c)(1),
(2), (4) Date: Aug. 7, 2002

(87) PCT Pub. No.: WO01/65430

PCT Pub. Date: Sep. 7, 2001

(65) Prior Publication Data

US 2003/0007615 A1    Jan. 9, 2003

(30) Foreign Application Priority Data

Feb. 28, 2000   (FR)   .................................. 00 02492

(51) Int. Cl.
*H04M 15/00*   (2006.01)
*H04M 17/00*   (2006.01)

(52) U.S. Cl. .............. 379/114.2; 379/114.15; 379/143; 379/144.01; 379/144.04

(58) Field of Classification Search ........... 379/114.01, 379/114.15, 114.17, 114.2, 143, 144.01, 144.04; 455/405, 406, 407, 408; 705/52, 53, 68, 705/69, 73, 76, 77, 80, 39, 40, 41, 44

See application file for complete search history.

(56) References Cited

U.S. PATENT DOCUMENTS

| 5,146,491 | A | * | 9/1992 | Silver et al. ........... 379/114.24 |
| 5,466,919 | A |   | 11/1995 | Hovakimian |
| 5,546,303 | A |   | 8/1996 | Helbling |
| 5,696,366 | A |   | 12/1997 | Ziarno |
| 5,909,794 | A |   | 6/1999 | Molbak et al. |
| 6,370,241 | B1 | * | 4/2002 | Clark ..................... 379/144.01 |
| 6,424,706 | B1 | * | 7/2002 | Katz et al. ............. 379/144.01 |
| 2003/0139999 | A1 | * | 7/2003 | Rowe .......................... 705/38 |

FOREIGN PATENT DOCUMENTS

| FR | 2 776 403 A | 9/1999 |
| WO | 93 08546 A | 4/1993 |

* cited by examiner

*Primary Examiner*—Quoc Tran
(74) *Attorney, Agent, or Firm*—Lowe, Hauptman & Berner, LLP

(57) ABSTRACT

The balance or a portion of the balance associated with a prepaid card with or without a microcircuit is paid into a balance portion collection server, as a donations to charities, after setting up a call between a terminal and the server and after confirmation of the payment by the user at the terminal to increment a counter with the balance or balance portion. In another embodiment, balance portions are paid cyclically into the server or into a connection unit as and when a telephone call runs.

21 Claims, 6 Drawing Sheets

PAYMENT TO CHARITIES WITH PREPAID CARD

REFERENCE TO RELATED APPLICATION

This application is a 371 of the PCT International Application No. PCT/FR01/00416 filed on Feb. 13, 2001, which is based on the French Application No. 00-02492 filed on Feb. 28, 2000.

BACKGROUND OF THE INVENTION

1—Field of the Invention

The present invention concerns prepaid cards, whether they are microcircuit cards, also referred to as integrated circuit or microprocessor cards, in which case the cards are sometimes referred to as telecards, or prepaid cards with no integrated circuit, also referred to as "calling cards" or virtual prepaid cards. For example, prepaid cards correspond to prepaid telephone use or to a credit issued by a retailer.

The invention relates to setting up of a set of means for making payments of donations to charities. These remote payments, also referred to as telepayments, are effected by decrementing units contained in a microcircuit card or in an account located in a server and associated with a card with no microcircuit.

The invention encompasses all prepaid cards and enables cardholders to make payments to a set of charities.

2—Description of the Prior Art

French patent application FR 2776403 describes an electronic funds collection system based on using an integrated circuit bank card. It relates to making donations to charitable or humanitarian organizations by means of the integrated circuit bank card. The general principle is as follows: for each banking transaction carried out normally, via a standard electronic payment terminal, a donation memorized in the card beforehand, which can be a percentage of the transaction or a fixed amount, increments an accumulator register in the card, under the control of the processor included in the card. The accumulator register therefore holds all donations associated with transactions effected since the last "emptying" of the accumulator register.

A second payment terminal is dedicated to the payment of the amount contained in the accumulator register of the card at the initiative of the person making the donation, i.e. the cardholder. The payment process is totally transparent for the user and the dedicated payment terminal. It proceeds in the following manner: when the card has been inserted, the user enters his personal identification number, as for a conventional banking transaction, and the terminal reads the banking references of the beneficiary organization in the card, resets the accumulator register in the card to zero and delivers a receipt for the amount paid to the user making the donation.

The funds collection system according to the patent application previously cited therefore uses a bank card and each payment results from the accumulation of donations depending on the amounts of respective successive transactions during a given period. The successive accumulations of donations are therefore handled entirely by the card. Also, the funds collection system requires a particular additional operation in the form of a banking transaction using a terminal dedicated exclusively to payment of donations accumulated in the card.

OBJECTS OF THE INVENTION

The invention aims to pay all or part of the balance of units, such as telephone units or monetary units, contained in or associated with a prepaid card purchased by the user of the card to at least one beneficiary entity, i.e. one or more charities.

To be more precise, an object of the invention is to facilitate using prepaid cards, for example cards relating to services such as telephone services or to products such as those available from a retailer, to pay donations to charities in the form of predetermined units, in a manner that is less inconvenient for the owner-user of the card, i.e. through standard use of the prepaid cards in non-dedicated prepaid card terminals, without necessitating second terminals dedicated exclusively to payment of the accumulated donations.

SUMMARY OF THE INVENTION

To this end, a method of paying a portion of the balance associated with a prepaid card for paying for any service or product from a terminal that is not dedicated to paying donations into a means for collecting balance portions via telephone transmission means, is characterized in that, after setting up a call between the terminal and the collecting means using the prepaid card, it includes the steps of:

detecting a payment confirmation in the collecting means, decrementing the balance by said balance portion in response to the detected payment confirmation, and incrementing a counter in the collecting means by the balance portion.

For example, the terminal is a public telephone and the balance is expressed in telephone consumption units which can then be converted into a monetary value.

In a first embodiment, the balance portion is said balance and the payment confirmation is transmitted in response to a prompt-to-pay message sent from the collecting means to the terminal only if all of the balance is to be paid, said prompt-to-pay message preferably containing a prompt to select a charity.

In a first variant of the first embodiment, the payment confirmation is transmitted in response to a prompt-to-select-a-payment message from the collecting means to the terminal only if the balance portion must decrement the balance, and is followed by transmission of a message from the collecting means to the terminal requesting the balance portion to be paid and by transmission of the selected balance portion from the terminal to the collecting means. Another payment confirmation is transmitted in response to the message prompting selection of the payment option only if all of the balance is to be paid.

Said call setting-up can result from an intentional call to the collecting means from the terminal, which call precedes identification of the card by the collecting means if the card is no microcircuit.

In a second variant of the first embodiment, the prompt-to-pay message is transmitted from the collecting means to the terminal only if the balance is below a predetermined threshold so that a payment to charities is systematically proposed to the user, before the balance of his prepaid card expires. On the contrary thereto, a telephone call from the terminal can be continued if the balance is above the threshold, or after a refusal to pay the balance is transmitted from the terminal to the collecting means. In this second variant, said call setting-up can result from the terminal seizing a telephone line followed by an automatic call to the collecting means from telephone connection means of the terminal if the balance is below the threshold.

When the card is a prepaid microcircuit card containing the balance and is to be inserted into the terminal to set up the call, the collecting means comprises a server containing said counter dedicated to the collection of balance portions and connection means connecting the server to the terminal to receive the balance from the card as soon as the call is set up, detecting the payment confirmation, decrementing the balance by the balance portion to constitute a decremented balance, and transmitting the decremented balance to the card via the terminal and the balance portion to the server.

When the card is a prepaid card with no microcircuit and having an identification number which is to be entered into the terminal, or to be generated automatically by the terminal, so that the collecting means can identify the card, the collecting means comprises a server containing said counter dedicated to collection balance portions and managing the balance of the card for detecting the payment confirmation after receiving a server payment number from the terminal, decrementing the balance and incrementing the counter.

In a second embodiment, the decrementing and incrementing steps are executed cyclically during a telephone call from the terminal and each time that a predetermined balance decrement is consumed. In this way, donations in the form of balance portions are paid systematically, and very often periodically, during a telephone call, and without any intervention by the user of the card.

When the card is a microcircuit card, the decrementing and incrementing steps can be executed cyclically in telephone connection means internal or external to the terminal, and the balance is transmitted from the card to the connection means after said setting-up.

The decrementing and incrementing steps are executed only in response to a payment indicator which is transmitted by the card to the collecting means if the card is a microcircuit card, or which is read in the collecting means in conjunction with an identification number of the card if the card is a card with no microcircuit. The payment indicator indicates to the collecting means the card user's prior agreement to cyclic payment of balance portions to charities, given at the time of purchase thereof. Accordingly, for a first use of the card, the method preferably includes, after call set-up, and in response to a message prompting contribution to the payments transmitted by the transmission means to the terminal, selection of at least one of the following three parameters including the decrement, the balance portion, and the identity of the entity for which the balance portion is collected.

After selecting at least one parameter, said at least one selected parameter and the payment indicator to be associated with the card are stored into the collecting means and are also stored into the card if the card is a microcircuit card.

For example, the first use of the card is detected by the collecting means if an initial credit read in the card or in the collecting means is equal to the balance of the card.

In the second embodiment, the collecting means is either of connection means for connecting the terminal to a telephone exchange or of the terminal itself, the counter accumulating the balance portions being emptied periodically into a server belonging to the beneficiary charities.

BRIEF DESCRIPTION OF THE DRAWINGS

Other features and advantages of the present invention will become more clearly apparent on reading the following description of preferred embodiments of the invention, given with reference to the corresponding accompanying drawings, in which.

DESCRIPTION OF THE PREFERRED EMBODIMENTS

The invention uses two types of prepaid cards, namely cards with a microcircuit and without a microcircuit.

A card of the first type, also referred to as a non-virtual card, contains a microcircuit wherein service or product units prepaid on purchasing the card are stored and correspond to a credit CR.

A card of the second type, also known as a virtual card, contains no processor microcircuit, the units associated with the card being included in a memory area which is located in a server connected to a telecommunication network. The second type of card also comprises prepaid cards including a read-only memory (ROM) having prestored a card identification number and a charity payment server call number, whereby these two numbers are read automatically by a payphone after the card is inserted therein, which avoids the card user having to enter these two numbers, which are usually long numbers.

For both types of card, units are deleted in the microcircuit or in the server as services or products are purchased with the card, so that a balance of units SO associated with the card, and initially equal to the credit CR, is reduced on each purchase.

Two embodiments of a payment method according to the invention are described hereinafter. In the first embodiment, all or part of the balance SO of service or product units associated with the card is paid to charities by an intentional action initiated by the cardholder. In the second embodiment, payments are made as and when prepaid units are consumed. Accordingly, in the second embodiment, a payment is made, for example, at the rate of NBO=1 unit every DE=25 consumed units.

In a preferred example referred to hereinafter, the units of a prepaid card provide access to a service, in this instance a telephone service; thus a unit is a telephone unit, but could be another service portion, for example a few seconds of air time.

Figure 1:
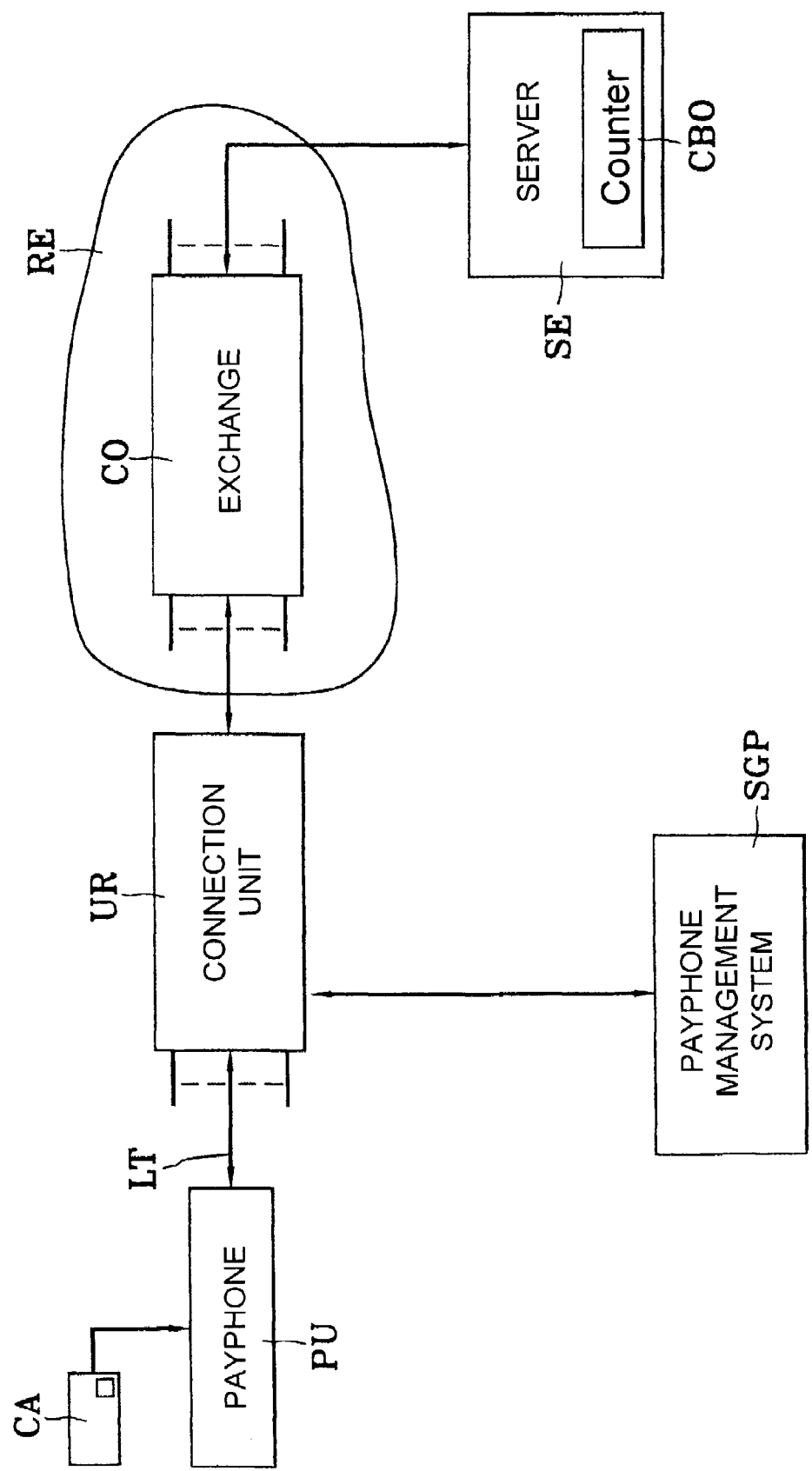
FIG. 1 is a block diagram of a connection between a telephone card payphone and a charity payment server.

FIG. 1 shows diagrammatically the essential means involved in a telephone call between a prepaid microcircuit phonecard CA, also referred to as a telecard, of the first type, and a server SE dedicated to a charity payment application and provided with voicemail and at least one telephone unit counter CBO for collecting telephone units as donations to charities. The essential means comprise a station accepting a prepaid card, for example a public payphone PU, for example a Publiphone™ payphone, or a public multimedia terminal, into which the card CA is inserted, a connection unit UR connected to the payphone by a user telephone line LT, and a routing autonomy exchange CO connecting the connection unit to the server SE and included in a telecommunication network RE, such as the switched telephone network. The messages produced by the server can be voice messages or, where applicable, text messages displayed on the payphone PU.

The connection unit UR services a plurality of payphones associated with it. It provides a number of intermediate functions related to the payphones and a payphone technical management system.

Apart from connecting the payphones to the telephone network and providing them with a remote power feed, the connection unit UR handles real time processing of outgoing calls from the payphones to monitor the payment means, such as a prepaid card. The connection unit also controls management operations relating to the associated payphones, in conjunction with a payphone management system SGP with a plurality of servers.

In another existing architecture, the connection unit and the management system are on the far side of the exchange CO, and in this case form a single system.

In particular, in the case of payments by means of a microcircuit card, after the card CA is inserted into the payphone PU and an outgoing call from the payphone PU has been set up, the connection unit UR periodically receives a telephone unit balance SO read in the card by the payphone, so that the connection unit UR knows the state of balance throughout the call. When the card is purchased, the balance SO is initially equal to a credit CR. The card becomes unusable either when the balance is zero, and remains unusable for as long as the balance remains zero if the card can be recharged, or becomes unusable beyond a card expiry date.

This embodiment is not limiting on the invention, as alternatives exist, even though they are not described here.

The essential means involved in a telephone call between a telephone card of the second type, with no microcircuit, are similar to those shown in FIG. 1. The card is analogous to a scratch card showing the call number of the server SE, for example 3-digit or 4-digit number, and, after scratching, an identification number IC of the card, which has to be entered before each call and consists of around ten digits; a card with no microcircuit, referred to as a virtual card, is therefore equivalent to an identification number IC and naturally cannot be inserted into a payphone. The server SE is not dedicated to payments to charities, but provides a wider management service relating to the characteristics of the prepaid cards with no microcircuit, such as in particular the units balance SO relative to the credit CR initially stored in the server prior to offering the card for sale, in corresponding relationship to the identification number IC of the card, and relating to the collection of payments for charities in accordance with the invention.

In the remainder of the description, the two main embodiments of the payment method in accordance with the invention and variants thereof are each first described in detail for a microcircuit prepaid card, followed by an explanation of the differences and similarities for a prepaid card with no microcircuit.

Figure 2:
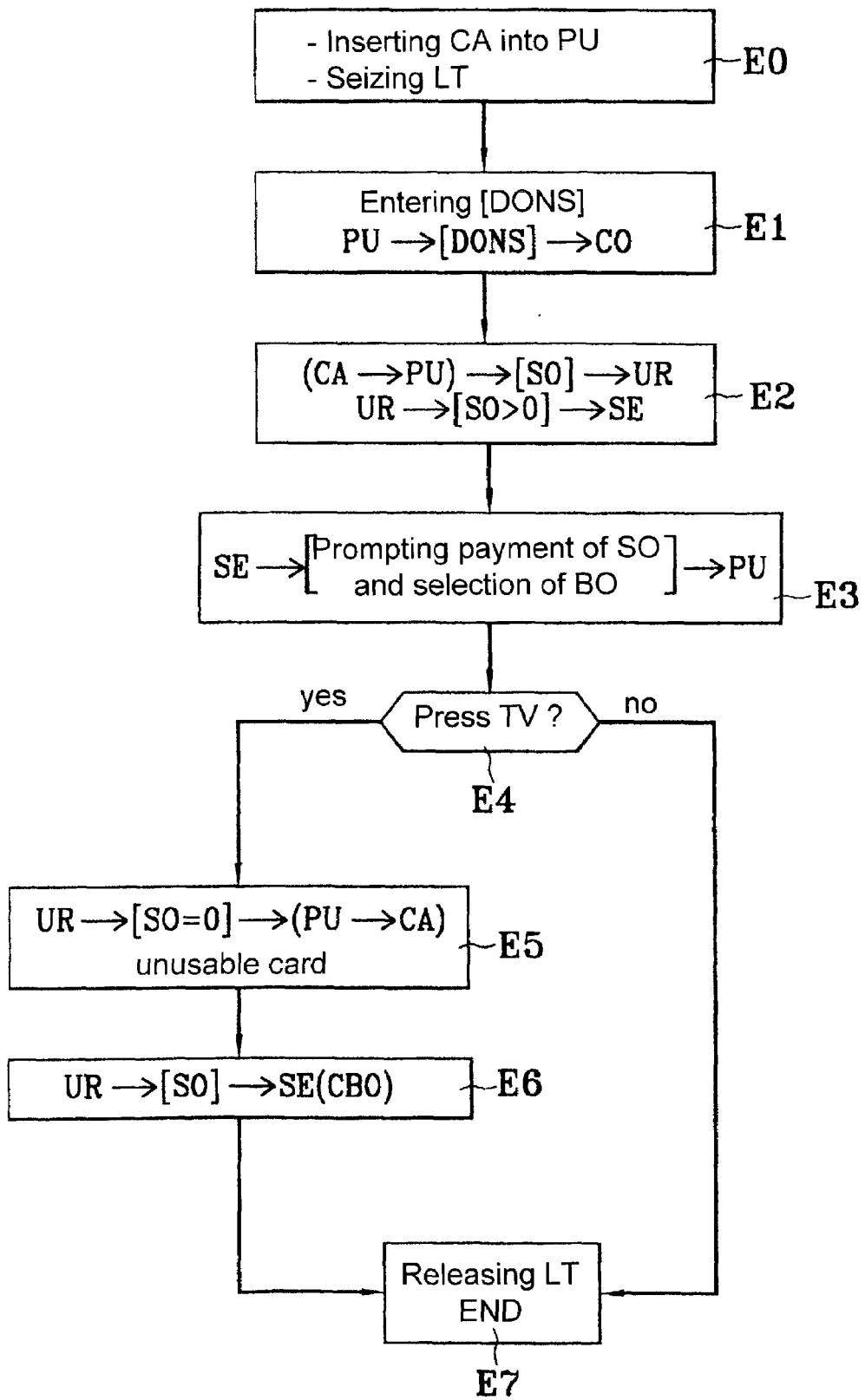
FIG. 2 is an algorithm of the method according to a first embodiment of the invention for intentional balance payment by means of a prepaid microcircuit card.

FIG. 2 shows a first embodiment of a method according to the invention of making payments to charities by an intentional act, which method includes main steps E0 to E7.

Setting up an outgoing telephone call from a payphone PU using a microcircuit card CA begins in step E0 by inserting the card into the payphone PU and lifting the handset to seize the line LT. This is known in the art. At the end of an identification procedure, and then, where applicable, at the end of active authentication of the card by the telephone network RE, a connection unit UR to which the payphone PU is connected sends a prompt-to-transmit tone. In step E1 the user of the card CA enters a short-code number that is easy to memorize, for example, in France, the number 3067 corresponding to the letters of the word "DONS" (donation). The telephone network directs the call to the dedicated server SE via the exchange CO.

Then, after the connection unit UR has read in the card CA the telephone unit balance SO transmitted in Dual Tone Multiple Frequency (DTMF) code, unit UR tells the server SE that the balance is positive, i.e. non-zero, in order to start up the charity payment application.

Then, in step E3, the server SE transmits to the payphone PU via the exchange CO and the unit UR a voice message prompting payment of the balance, for example:

"There is a balance SO on your card; do you want to donate the corresponding amount to charities BO? If yes, press the TV key to confirm, if no, hang up", wherein the transmitted balance SO, which is preferably displayed on the payphone, is a number of telephone units, or is expressed in numerary value, and TV denotes a predetermined confirmation key, for example a green key on the payphone. A predetermined confirmation can also be given via a voice recognition system.

After detecting a confirmation signal transmitted by the payphone PU after the confirmation TV made by the user in step E4, the connection unit UR cancels the balance SO in the card CA as a donation and sends it via the payphone PU in step E5; because all the prepaid telephone units have been "consumed", the card CA contains a zero balance and is unusable. Simultaneously, in step E6, the connection unit UR sends the server SE a DTMF sequence containing the number of units SO for incrementing the counter CBO corresponding to the charities BO in the server. The method is then completed by either the payphone PU or the server SE via the connection unit UR releasing the line LT in step E7.

In step E4, if the user has not hung up after a time-delay of a few tens of seconds following on from step E3, the server SE releases the line LT and terminates the method in step E7, without making a donation.

Complementing steps E3 and E4, the server SE also prompts the user to select a charity BO by sending a request "To which charities?" to the payphone PU in step E3, associating predetermined keys with respective charities, for example, by displaying a table on the screen of the payphone, and selecting the key associated with the charity BO selected by the user in step E4.

If the card CA is a card of the second type, with no microcircuit, everything described in relation to the balance SO in the unit UR in FIG. 2 is effected in the server SE, which here manages cards of the second type.

In the initial step E0, the 3-digit or 4-digit call number of the server SE and then, after seizing the line LT, the identification number of the card are entered on the keypad of the payphone PU, or generated automatically after inserting the card into the payphone and reading the numbers from the ROM in the card; here the payphone can be replaced by any telephone terminal, including a radiotelephone terminal, possibly provided with a card reader. The identification number transmitted from the payphone PU to the network RE is analyzed by the server SE to identify the card and activate a unit downcounter in the server containing the balance SO associated with the card and initially storing the credit CR before the prepaid card is offered for sale.

Then, in response to a prompt-to-transmit tone transmitted from the unit UR to the payphone PU, the user enters the payment number corresponding to the word "DONS" on the keypad in step E1. When the server recognizes the word "DONS", it registers the intention of the user to make a payment to the charities BO. After examining that the balance SO is positive in step E2, the prompt-to-pay message is transmitted by the server in step E3 and steps E4 to E7, depending on whether payment of the donation is confirmed or not by pressing the TV key, the transfer of the balance SO decremented to zero from the unit counter into the counter CBO in steps E5 and E6 being effected internally in the server SE.

Figure 3:
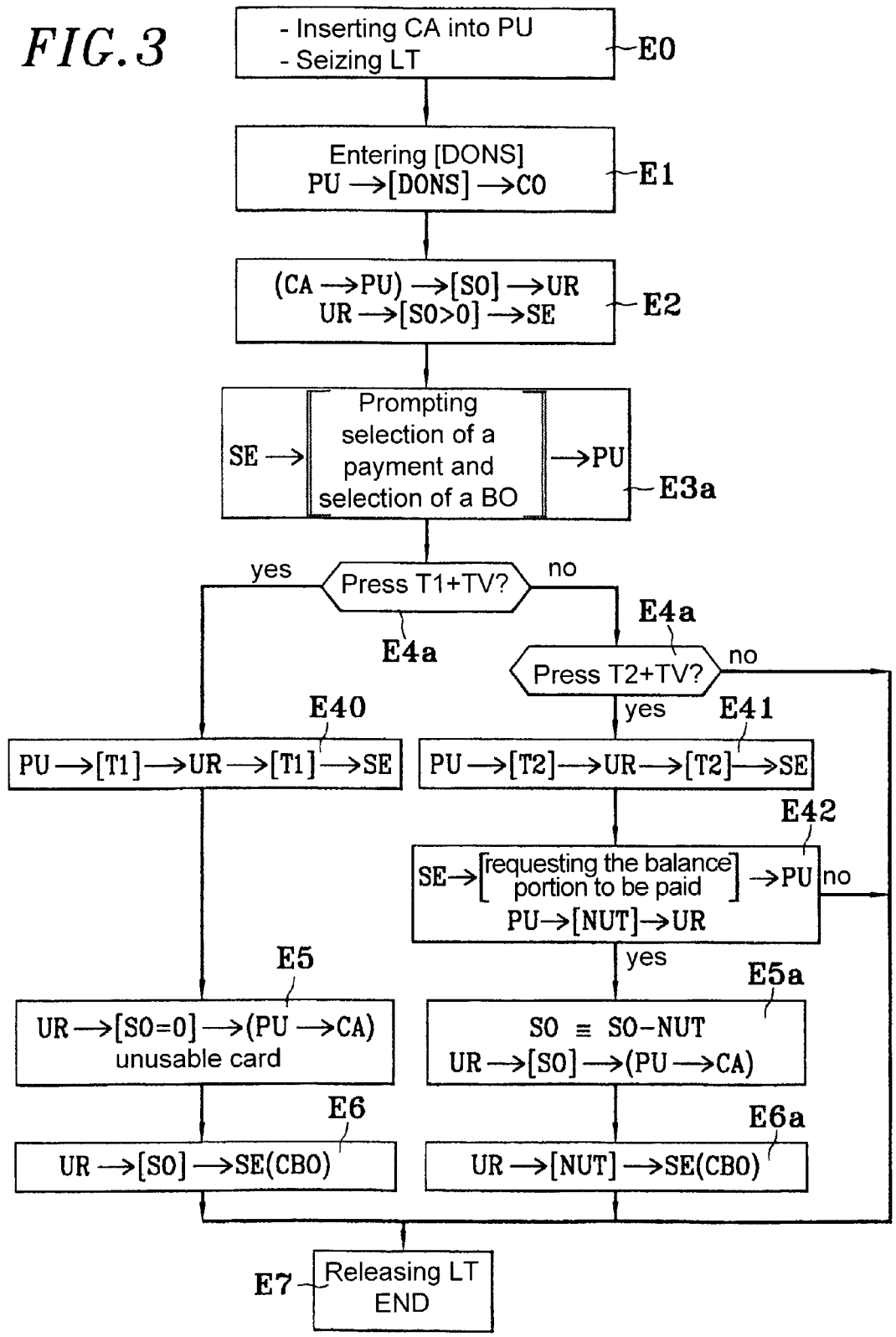
FIG. 3 is an algorithm according to a first variant of the first method embodiment, shown in FIG. 2, for intentional payment of a balance portion.

In a first variant of the first embodiment, shown in FIG. 3, relating to payment of a portion of the card balance, the payment method includes the steps E0, E1, E2 and E5 to E7, as well as, between the steps E2 and E5, steps E3a and E4a analogous to steps E3 and E4 and additional steps E40 to E42 which, with step E4a, replace step E4, step E42 being followed by steps E5a and E6a analogous to steps E5 and E6.

After the connection unit UR signals a positive balance SO in the card to the server SE in step E2, the server SE sends the payphone PU a message prompting selection of a payment, where applicable including a prompt to select a charity BO, via the network RE and the unit UR in step E3a, in order for the user to select to pay either the entire balance SO, as in step E3, or a portion of the balance, the balance or the portion of the balance being expressed as a number of telephone units or in numerary value. The voice message previously cited can be as follows:

"There is a balance of SO on your card; do you want to make a donation to the charities BO?

If you want to pay the whole balance, press the T1 key and confirm by pressing the TV key;

if you want to pay only a portion, press the T2 key and confirm by pressing the TV key;

if not, hang up".

The balance SO is preferably displayed on the payphone PU.

If, in the next step E4a, the user has pressed the T1 and TV keys, the connection unit UR sends a DTMF code corresponding to the T1 key (digit 1) to confirm payment of the whole of the balance to the server SE in step E40. The method continues with the connection unit UR sending a write instruction containing the number of telephone units used as a donation, equal to or corresponding to the balance, to the payphone PU and to the server SV in steps E5 and E6, before releasing the line LT in step E7.

On the other hand, if in step E4a the user decides to press the T2 and TV keys, the connection unit UR sends a DTMF code corresponding to the T2 key (digit 2) to the server SE in step E41. Then, in response to the code of the T2 key, the voicemail in the server SE sends a voice message requesting the balance portion to be paid to the payphone PU in step E42, such as:

"How many telephone units do you want to pay? Enter the number and confirm by pressing the TV key".

The user then enters on the keypad of the payphone the number NUT of charge metering units, or a numerary value, less than the balance SO indicated in step E3a, and presses the TV key. The method then moves on to steps E5a and E6a, during which the balance SO is decremented by the number NUT of telephone units constituting a donation and corresponding to the balance portion indicated by the user. The decremented balance is transmitted in DTMF code to the payphone PU for updating the card CA and to the server SE for incrementing the counter CBO, the algorithm terminating with step E7.

If, in step E4a or E42, the user is on-hook, or has not pressed one of the pairs of keys T1+TV or T2+TV, or has not entered a number NUT and pressed the TV key, after a time-delay of a few tens of seconds following on from step E3a or E42, the method is terminated in step E7 either by the payphone PU or by the server SE releasing the line LT via the connection unit UR.

For a prepaid card of the second type, with no microcircuit, steps E0 to E4a are applied in a similar manner to the steps E0 to E4 previously described. Steps E5 and E6, or E5a and E6a, relating to transferring the balance SO or the number of units NUT to be paid to charities to the counter CBO, are performed internally in the server SE, with decrementation of the downcounter of units associated with the card.

Figure 4:
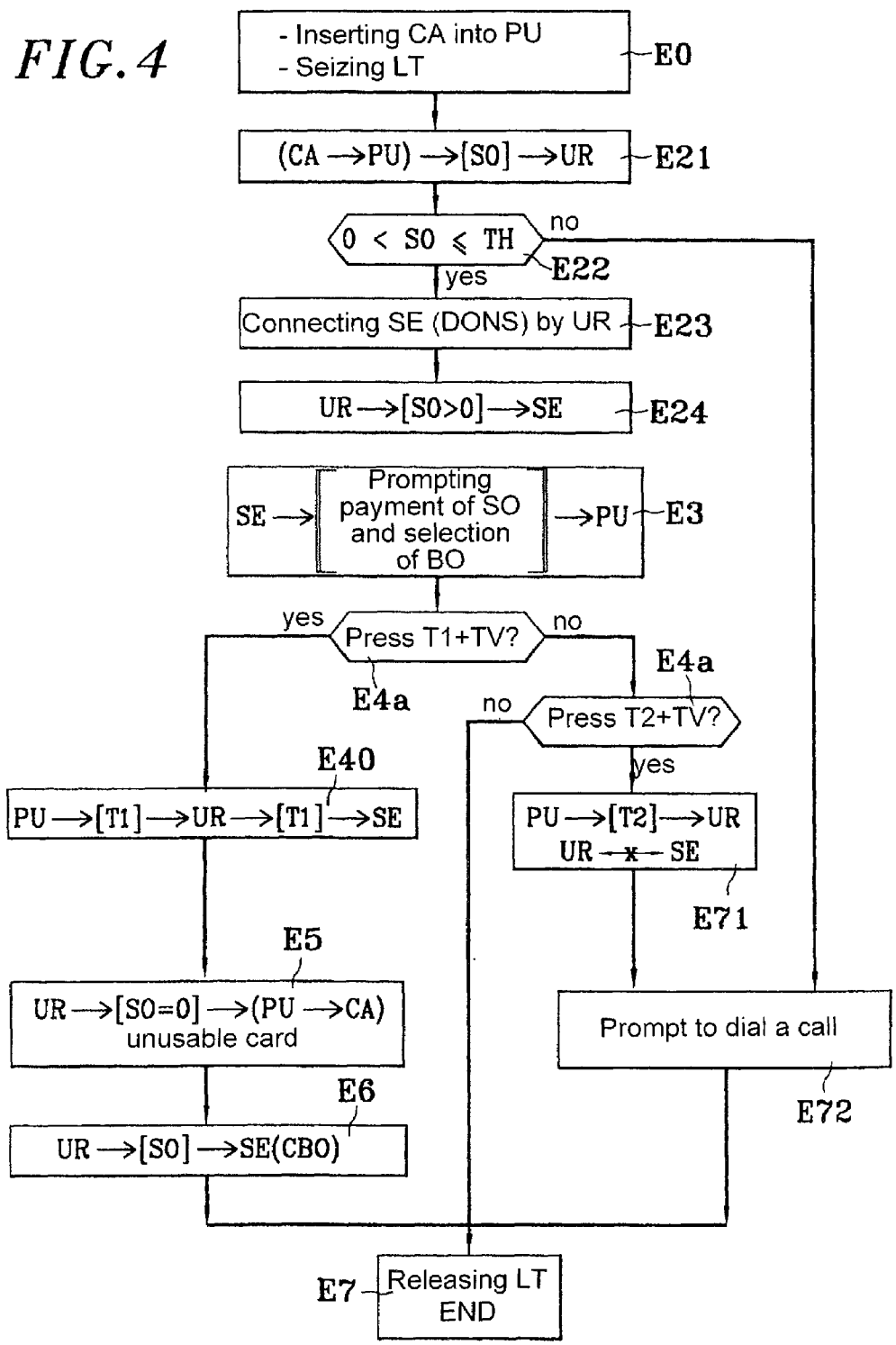
FIG. 4 is an algorithm according to a second variant of the second method embodiment, shown in FIG. 2, for payment by systematic solicitation.

In a second variant of the first embodiment, shown in FIG. 4, the payment algorithm is modified so that it systematically encourages the user to pay the balance on the card when it is equal to or less than a threshold TH, for example equal to three telephone units.

At the start of the second variant, after the initial step E0, step E1 is eliminated and four steps E21 to E24 replace step E2 so that the server SE is called automatically if the balance is at most equal to the threshold TH. After the connection unit UR stores the balance SO read from the card in step E21, the connection unit UR compares the read balance SO transmitted by the payphone to the threshold TH in step E22. If the balance SO is less than or equal to the threshold TH in step E22, the connection unit UR calls the server SE by dialing the number "DONS" automatically and connects the connection established in this way with the server SE dedicated to payments through to the link with the payphone PU in step E23 so that the connection unit UR can transmit the balance SO to the server SE in step E24. If the balance is not equal to zero, the server SE sends the payphone PU a voice message prompting payment of the balance in step E3, for example:

"There is still a balance of SO on your card, do you want to donate the corresponding amount to the charities BO?

If you agree, press the T1 key, if not press the T2 key, and confirm by pressing the TV key", in order to propose a payment equivalent to the card balance. As shown in FIG. 2, this message may contain a prompt to select a charity BO.

In the event of a positive response, by pressing the T1 and TV keys in the next step E4a, the method continues with steps E40, E5, E6 and E7, already commented on with reference to FIG. 3. The balance SO in the card CA is set to zero and increments the counter CBO in the server SE.

In the opposite situation, the user declines to pay the balance, and presses the T2 and TV keys in step E4a. This refusal to pay the balance is transmitted by the payphone PU to the connection unit UR which clears down its connection with the server SE in step E71. The connection unit UR transmits the prompt-to-dial tone for the normal continuation of a telephone call from the payphone PU, as indicated in step E72, which is also executed if the balance SO is greater than the threshold TH in step E22.

The final step E7 of releasing the telephone line LT follows on from step E6 or E72.

If neither the T1 key nor the T2 key is pressed during a predetermined time-delay in step E4a, the server SE releases the line LT in step E7.

In this second variant of the first embodiment, if the card CA is a prepaid card with no microcircuit, after the server SE identifies the card in step E0, steps E21 to E24 are reduced to the step E22, in which the server SE compares the balance SO associated with the identified card CA to the threshold TH. If the balance is less than or equal to the threshold TH, steps E3 to E7 are executed as a function of the choice made by the user by pressing the T1 and TV keys or the T2 and TV keys, steps E5 and E6 being executed internally in the server.

If the terminal is not a payphone, the voice messages sent by the server indicate the counterparts of the T1, T2 and TV keys.

In a second embodiment of the invention, payments to charities are made cyclically as and when telephone consumption accounted for in the card is counted down, for example at the rate of NBO=1 unit every DE=10 units consumed. The cyclic payment method is transparent for the user. A cyclic payment indicator IV indicating that the microcircuit card CA is cooperating with the cyclic payment method is written in a memory area of the microcircuit card reserved for particular applications and referred to as the user area.

Figure 5:
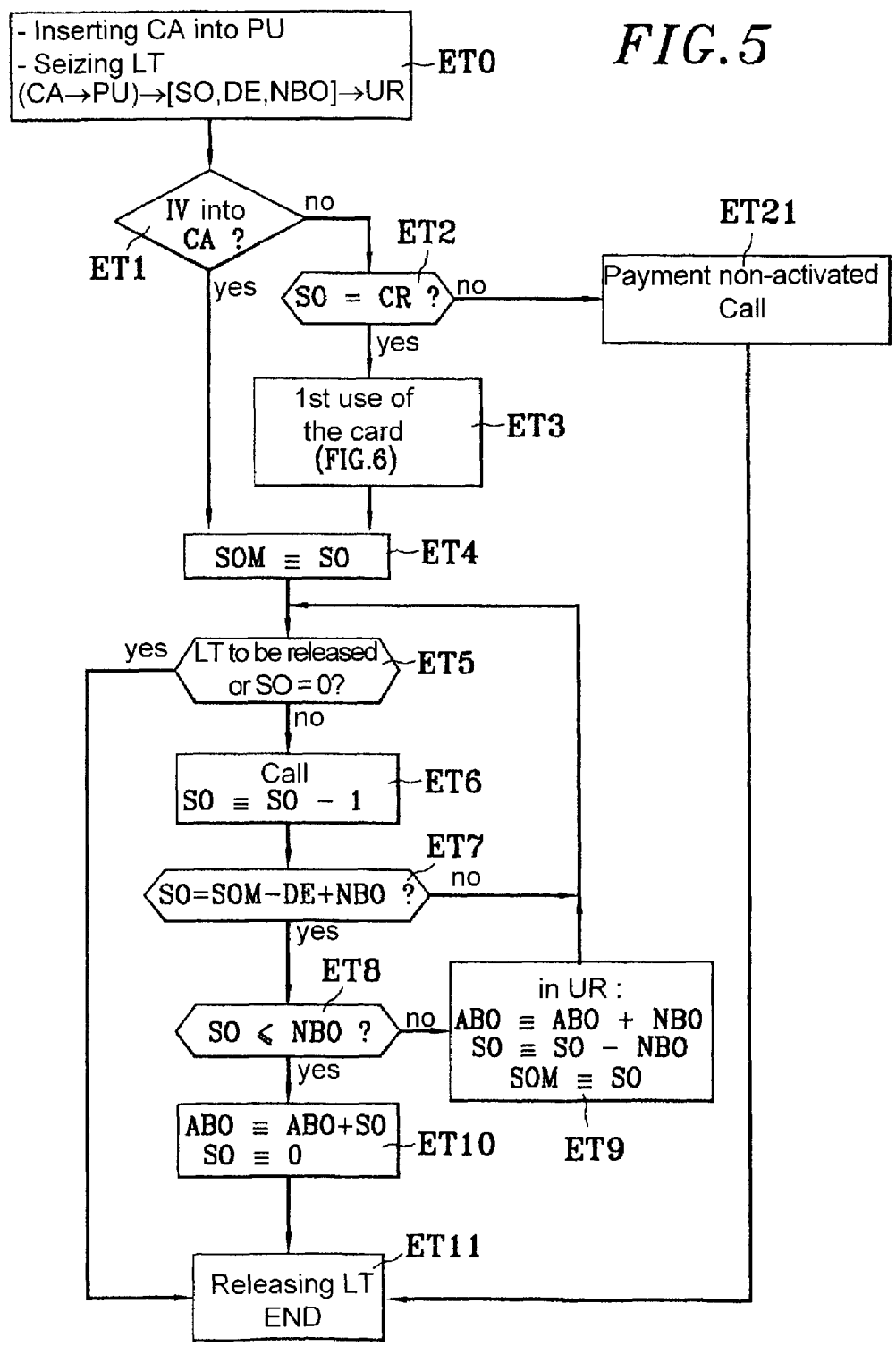
FIG. 5 is an algorithm of the method according to a second embodiment of the invention for cyclic payment by means of a prepaid microcircuit card.

This second embodiment of the payment algorithm, shown in FIG. 5, mainly includes steps ET1 to ET11 following an initial step ET0 identical to step E0 and the start of step E2.

During a step ET1 of identifying the card CA, the connection unit UR or the payphone PU checks that the reserved memory area contains the indicator IV. If the indicator IV is not detected, i.e. if the card does not support the cyclic payment service, the method moves on to a step ET2 that can initiate a step ET3 of verifying the first use of the card, described in detail later, or to a step ET21 consisting of the normal procedure for setting up a telephone call, beginning with the prompt-to-dial tone.

On the other hand, if the payment indicator IV is detected by the connection unit UR or in the payphone PU in step ET1 thereby validating a cyclic payment, the unit UR proceeds to execute telephone unit payments described hereinafter during cyclic steps ET5 to ET11 activated in the connection unit UR during the normal telephone call, after a maximum balance variable SOM is made equal to the telephone unit balance SO in the card read by the unit UR in an initial cycle step ET4.

At the beginning of a payment cycle with a telephone unit decrement DE and continuously during such a cycle, the connection unit UR verifies in step ET5 that the telephone call set up between the payphone PU and a telephone terminal called via the connection unit UR and the network RE in step ET0 is not to be cleared down, i.e. that the line LT is not to be released and that the read telephone unit balance SO is not zero; otherwise, the supplementary decrementing of the balance SO is stopped in the final step ET11 for clearing down the line LT if that has not been done already.

During the telephone call set up in step ET6 for the first cycle, the unit balance SO in the card CA is normally, and often periodically, decremented by one telephone unit as a function of charge metering criteria determined by the operator of the network RE, or more generally by the service or product provider managing the prepaid cards, i.e. SO=SO−1 in each step ET6, provided that the balance does not reach the value SOM−DE+NBO in step ET7. NBO denotes a balance portion constituting a cyclic donation equal to a number of telephone units by which the balance SO is automatically decremented for every DE telephone units counted down from the last value SOM, and thus such that NBO<DE, the number NBO incrementing a charities counter CBO in the server SE collecting the donation. If the balance SO reaches the lower limit SOM−DE+NBO in step ET7 and if the balance SO is greater than NBO in the next step ET8, a charities accumulator ABO in the form of a memory area allocated to the payphones attached to the connection unit UR is incremented by the number NBO of telephone units deducted during the current cycle in step ET9. The balance SO is then decremented by the number NBO of units deducted and the variable SOM is made equal to the balance SO before another cycle is begun, provided that the balance SO is not zero and the telephone call is not interrupted in step ET5.

If in step ET8 the balance SO is at most equal to the number NBO, the accumulator ABO is incremented by the balance SO, which is in the range from NBO to 0, and the balance is set to zero before the line LT is released by the unit UR in the final step ET11.

For example, if the balance SO is 43 telephone units in the line seizing step ET0, and if the network operator RE has fixed, in the connection unit UR, the cyclic decrement DE at 10 units and the number NBO of units to be cyclically deducted at 2, 2 telephone units are deducted from the balance SO in favor of the charities BO and added to the accumulator ABO in step ET9, as and when the balance successively reaches the values 35, 25, 15 and 5 in step ET7, if the call is not broken off in the meantime in step ET5.

If several payphones are connected to the connection unit UR, the content of the accumulator ABO totalizes the telephone units paid to the charities BO by the payphones. The remote server SE periodically, for example once a day, empties the accumulator in the unit UR, i.e. reads the cumulative count and then resets the accumulator to zero. The counter CBO in the server SE therefore accounts for all payments via payphones managed by the operator.

Returning to step ET1, the cyclic payment indicator IV inside the microcircuit card CA is stored by one or other of the following two methods.

In the first method, there are particular series of cards specifically dedicated to payments to charities. The indicator IV is then written into the card CA while writing "personal" characteristics of the card during the fabrication thereof. For a card using the first method, the payment method shown in FIG. 5 goes directly (ET1, yes) from step ET0 to step ET4.

In the second method, a memory area is reserved for the indicator IV in the card CA during the fabrication thereof, but the indicator IV has not yet been written into the reserved memory area when the prepaid card CA is purchased, and is to write when the first time the card is used.

When the card CA is inserted into a payphone for its first use, the connection unit UR does not detect the indicator IV in step ET1. In the next step ET2, the connection unit UR compares the initial credit CR read in the card, for example 50 or 120 telephone units, to the telephone unit balance SO.

If the balance SO is not equal to the credit CR, i.e. if CR−SO telephone units have already been consumed, the card CA has already been used (step ET2, no). As no indicator IV was detected in the preceding step ET1, the card CA is a normal prepaid card. The method continues normally with the setting up of an outgoing call in step ET21, starting with the dial tone.

Figure 6:
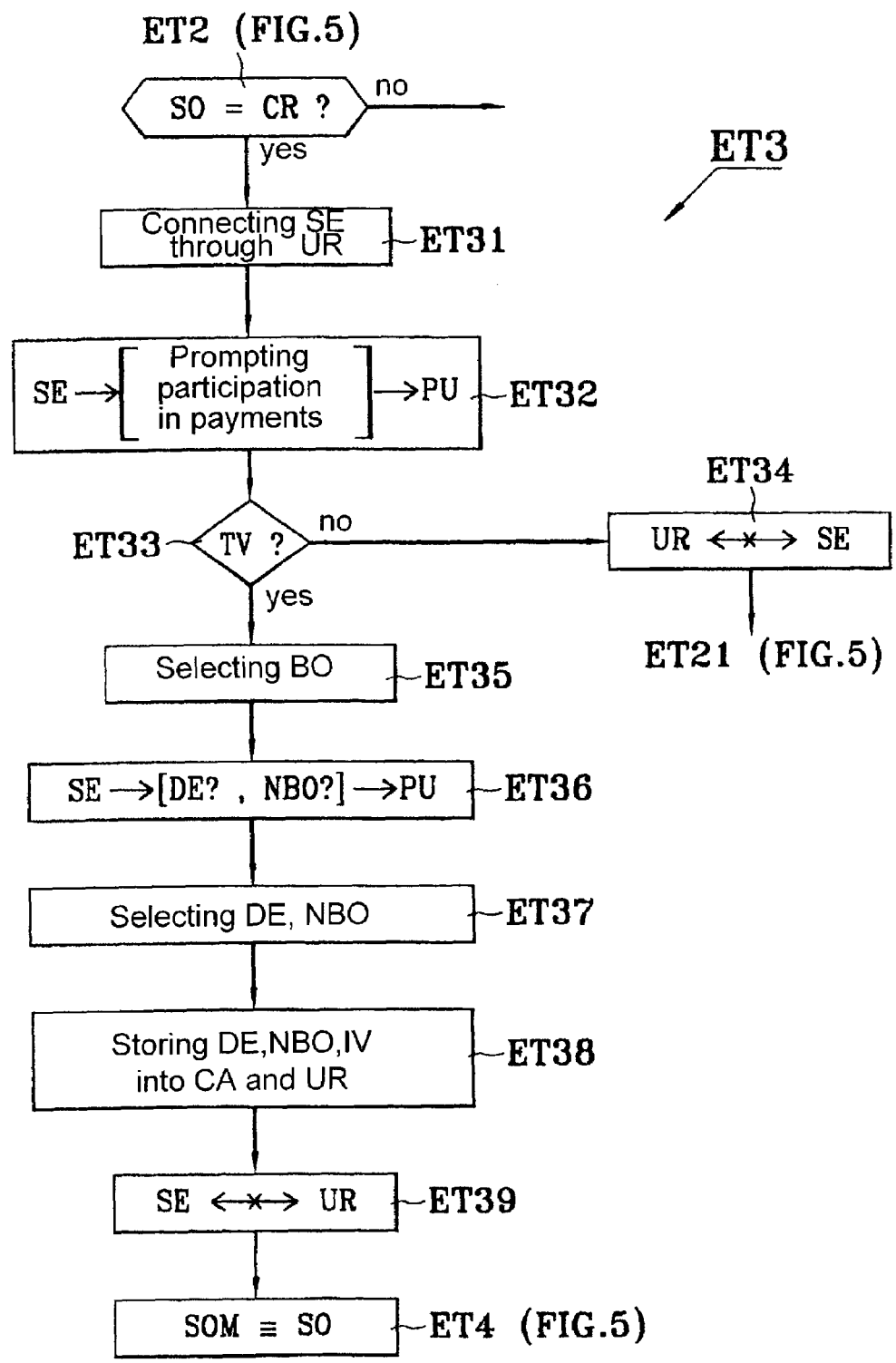
FIG. 6 shows in detail a portion of the FIG. 5 algorithm, for a first use of the card.

If the balance SO and the credit CR are equal in step ET2, this is the first use of the card CA, which necessitates execution of the step ET3 shown in detail in FIG. 6 and including steps ET31 to ET39.

In step ET31, the connection unit UR calls the dedicated server SE which initiates a dialog with the payphone PU to invite the user to cooperate in the donation payment procedure after first writing the indicator IV.

The voice message from the server SE, in response to the call by the connection unit UR, transmits to the payphone a message prompting participation in payments at the payphone PU in step ET32, for example:

"Do you want to contribute to payments to the charities BO?".

If the user's response is negative in the next step ET33, for example if the user presses any key on the keypad of the payphone other than the confirmation key TV, or does not press any key at all during a predetermined time-delay, the server is disconnected from the connection unit UR in step ET34 and a call can be set up in the normal way in step ET21.

If the user responds positively, by pressing the confirmation key TV in step ET33, the server SE sends a request "To which charities?" to the payphone in step ET35 in order to associate predetermined keys with respective charities, for example by displaying a table on the screen of the payphone. Then, following selection of a charity BO by the user and transmission of the identity of the selected charity BO from the terminal TE to the server SE, the server sends a voice message "With which decrement DE and number of units NBO to be paid cyclically?" to the payphone in step ET36. As an alternative to this, the server itself proposes several numbers of units NBO and several decrements DE, for example NBO=1 or 2 units to be paid every DE=10 or 25 units, by means of a voice message and/or in a table displayed on the payphone. The user selects parameters DE and NBO by pressing predetermined keys indicated by the display or by the voice message in step ET37. Then, in step ET38, the selected parameters DE and NBO are stored into the card CA and transmitted by the card to the connection unit UR, which stores them. The payment indicator IV is also stored into the reserved memory area of the card. The connection unit UR then disconnects from the server SE in step ET39. The payment method continues in step ET4 for a telephone call with a cyclic payment of NBO units for every DE units consumed.

On the next use of the card CA, the parameters DE and NBO and the balance SO in the card CA are read by the connection unit UR, as indicated in parentheses in step ET0 (FIG. 5), and the method then moves directly from step ET0 to step ET4, because the connection unit UR has detected the payment indicator IV in the card.

For the second embodiment using cyclic payment by means of a prepaid card with no microcircuit, the payment indicator IV is stored into the server SE in association with the identification number IC of the card and the balance SO is read in the server:

either beforehand, before the sale of the card belonging to a particular series, while writing all the "personal" characteristics relating to the card into the server, or on the first use of the card in step ET3 (FIG. 6) to set up a first call paid for from the credit CR on the card, the server requesting (step E32) the user to agree (step ET33; yes) or to decline to make payments of donations. The parameters selected by the user in steps ET35 and ET37 are merely stored into the server SE. The payment indicator IV associated with the number IC in the memory in the server SE indicates that the card user is disposed to accept payment of donations.

Following identification of the card CA in the server SE in step ET0, the server, rather than the unit UR, tests the value contained in the reserved memory area for the payment indicator IV in the server in step ET1. If the latter is present, then the cycle steps ET4 to ET11 are executed in the server SE in relation to the variables SO, SOM and ABO, and the accumulator ABO can constitute directly the content of the counter CBO in the server.

Although the invention has been described in detail above in connection with telephone calls, the service provider can be an entity other than a telephone operator, such as a retailer of products or services other than telephone calls, for example for ordering basic commodities, drawing up a list of horses for a horse race, or filling in a game voucher such as a lottery voucher, etc. A unit can be a monetary unit or another kind of other predetermined unit, for example a unit agreed between a player and a company organizing a game.

What we claim is:

1. A method of paying a portion of a balance associated with a prepaid card for paying for any service or product from a terminal that is not dedicated to paying donations into a collector for collecting balance portion via telephone transmission means, said method including, after setting up a call between said terminal and said collector using said prepaid card, the steps of:

detecting a payment confirmation in said collector, decrementing said balance by said balance portion in response to said detected payment confirmation, and incrementing a counter in said collector by said balance portion, said decrementing and incrementing steps being executed cyclically during a telephone call from said terminal and each time a predetermined balance decrement is consumed.

2. A method according to claim 1, wherein said balance portion is said balance and said payment confirmation is transmitted in response to a prompt-said terminal only if all of said balance is to be paid, said prompt-to-pay message containing a prompt to select a charity.

3. A method according to claim 1, wherein said payment information is transmitted in response to a prompt-to-select-a-payment message from said collecting means to said terminal only if said balance portion must decrement said balance portion to be paid and by transmission of said balance portion from said terminal to said collecting means.

4. A method according to claim 3, wherein another payment confirmation is transmitted in response to said prompt-to-select-payment message only if all of said balance is to be paid.

5. A method according to claim 1, wherein said call setting-up results from an intentional call to said collector from said terminal, which call precedes identification of said card by said collector if said card includes no microcircuit.

6. A method according to claim 2, wherein said prompt-to-pay message is transmitted from said collector to said terminal only if said balance is below a predetermined threshold.

7. A method according to claim 6, wherein a telephone call from said terminal is continued if said balance is over said predetermined threshold.

8. A method according to claim 6, wherein a telephone call from said terminal is continued after refusal to pay said balance is transmitted from said terminal to said collector.

9. A method according to claim 1, wherein said call setting-up results from said terminal seizing a telephone line followed by an automatic call to said collector from a telephone connection arrangement of said terminal if the balance is below said predetermined threshold.

10. A method according to claim 1, wherein said card is a prepaid microcircuit card containing said balance and inserted into said terminal to set up the call, said collector comprises a server containing said counter dedicated to the collection of said balance portions, a connecting arrangement from said server to said terminal for receiving said balance from said card as soon as said call is set up, a detector from said payment confirmation, a decrementor for decrementing said balance by said balance portion to constitute a decremented balance and transmitter for transmitting said decremented balance to said card via said terminal and said balance portion to said server.

11. A method according to claim 1, wherein said card is a prepaid card with no microcircuit and having an identification number generated into said terminal so that said collector can identify said card, and said collector comprises a server including said counter dedicated to collection balance portions and managing said balance of said card for detecting said payment confirmation after receiving a server payment number from said terminal, a decrementor for decrementing said balance portion, and an incrementor for incrementing said counter.

12. A method according to claim 1, wherein said card is microcircuit card and said decrementing step and incrementing step are executed cyclically in a telephone connection arrangement to said terminal, and said balance is transmitted from said card to said connection arrangement after said call setting-up.

13. A method according to claim 1, wherein said card is a microcircuit card, and said decrementing step and incrementing step are executed only in response to a payment indicator which is transmitted from said card to said collecting means.

14. A method according to claim 1, wherein said card is a card with no microcircuit and said decrementing step and incrementing step are executed only in response to a payment indicator which is read in conjunction with an identification number of said card in said collector.

15. A method according to claim 1, comprising, for a first use of said card, after said call setting-up, and in response to a prompt-to-contribute-to-payments message transmitted from said collector to said terminal, selection of at least one of the following three parameters including said balance decrement, said balance portion, and the identity of an entity for which said balance portion is collected.

16. A method according to claim 15 wherein, after said selection at least one parameter and a payment indicator to be associated with said card are stored into said collector and into said card if said card is a microcircuit card.

17. A method according to claim 15, wherein said first use of said card is detected by said collector if an initial credit read in one of said card and said collector is equal to said balance of said card.

18. A method according to claim 1, wherein said collector includes a connection arrangement for connecting the terminal to a telephone exchange.

19. A method according to claim 1, wherein said collector is the terminal itself, said counter accumulating said balance portions being emptied periodically into a server.

20. A method according to claim 1, wherein said terminal is a public telephone and said balance is expressed in telephone consumption units.

21. A method of paying a portion of a balance associated with a prepaid card for paying for any service or product from a terminal that is not dedicated to paying donations into a collector for collecting balance portion via telephone transmission means, said method including, after setting up a call between said terminal and said collector using said prepaid card, the steps of:

detecting a payment confirmation in said collector,
  decrementing said balance by said balance portion in response to said detected payment confirmation,
  incrementing a counter in said collector by said balance portion,
  said balance portion being said balance, and
  said payment confirmation being transmitted in response to a prompt by said terminal only if all of said balance is to be paid, said prompt-to-pay message including a prompt to select a charity.

* * * * *